US008725375B2

(12) United States Patent
Mochiyama et al.

(10) Patent No.: US 8,725,375 B2
(45) Date of Patent: May 13, 2014

(54) HYDRAULIC CONTROL APPARATUS FOR VEHICLE

(75) Inventors: Shinya Mochiyama, Fuji (JP); Hideharu Yamamoto, Fujinomiya (JP)

(73) Assignees: JATCO Ltd., Fuji-shi (JP); Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/283,909

(22) Filed: Oct. 28, 2011

(65) Prior Publication Data

US 2012/0109478 A1    May 3, 2012

(30) Foreign Application Priority Data

Nov. 1, 2010   (JP) ................................ 2010-245724

(51) Int. Cl.
*G06F 17/00*   (2006.01)
(52) U.S. Cl.
USPC .............................................. 701/68; 701/67
(58) Field of Classification Search
USPC ..................... 701/68, 116, 117, 67
See application file for complete search history.

(56) References Cited

U.S. PATENT DOCUMENTS

| | | | |
|---|---|---|---|
| 5,361,213 A | 11/1994 | Fujieda et al. |
| 5,697,479 A | 12/1997 | Kono et al. |
| 5,800,308 A | 9/1998 | Tsutsui et al. |
| 5,871,419 A | 2/1999 | Amendt |
| 5,916,058 A | 6/1999 | Sakai et al. |
| 5,944,632 A | 8/1999 | Hara et al. |
| 6,022,295 A | 2/2000 | Liu |
| 6,033,340 A | 3/2000 | Amendt et al. |
| 6,033,342 A | 3/2000 | Steinel et al. |
| 6,110,072 A | 8/2000 | Harada et al. |
| 6,135,919 A | 10/2000 | Shimakura |
| 6,253,137 B1 | 6/2001 | Abo et al. |
| 6,494,810 B1 | 12/2002 | Mack et al. |
| 6,527,672 B1 | 3/2003 | Henneken et al. |

(Continued)

FOREIGN PATENT DOCUMENTS

| | | |
|---|---|---|
| EP | 1 972 833 A2 | 9/2008 |
| JP | 60-136662 A | 7/1985 |

(Continued)

OTHER PUBLICATIONS

H. Akebono, U.S. PTO Notice of Allowance, U.S. Appl. No. 13/283,974, dated Nov. 23, 2012, 13 pages.

(Continued)

*Primary Examiner* — Mary Cheung
*Assistant Examiner* — Michael Berns
(74) *Attorney, Agent, or Firm* — Foley & Lardner LLP

(57) ABSTRACT

The hydraulic control apparatus calculates a target engagement hydraulic pressure of a frictional engagement element, controls the frictional engagement element so that a revolution speed at a driving source side of the frictional engagement element is higher than a revolution speed at a driving wheel side of the frictional engagement element, outputs a command current to a solenoid valve on the basis of a map having a relationship between the target engagement hydraulic pressure and the command current, and decreases the engagement hydraulic pressure when a vehicle speed is equal to or less than a predetermined vehicle speed at which the vehicle is judged to be vehicle stop during execution of the slip control. Further, the hydraulic control apparatus corrects the map so that a variation of the command current with respect to a variation of the target engagement hydraulic pressure is small when decreasing the engagement hydraulic pressure.

4 Claims, 8 Drawing Sheets

(56) References Cited

U.S. PATENT DOCUMENTS

| | | |
|---|---|---|
| 6,565,473 B2 | 5/2003 | Endo et al. |
| 6,602,160 B2 | 8/2003 | Tsutsui |
| 6,658,341 B2 | 12/2003 | Inoue et al. |
| 6,769,502 B2 | 8/2004 | Nakamori et al. |
| 7,089,095 B2 | 8/2006 | Takami et al. |
| 7,226,383 B2 | 6/2007 | Namba |
| 7,359,785 B2 | 4/2008 | Yoshida et al. |
| 7,404,460 B2 | 7/2008 | Oshidari |
| 7,465,250 B2 | 12/2008 | Tamai et al. |
| 7,610,891 B2 | 11/2009 | Seufert et al. |
| 7,730,982 B2 | 6/2010 | Hidaka et al. |
| 7,828,096 B2 | 11/2010 | Hoher et al. |
| 8,037,858 B2 | 10/2011 | Seufert et al. |
| 8,065,047 B2 * | 11/2011 | Hasegawa et al. ............... 701/22 |
| 8,108,115 B2 | 1/2012 | Kobayashi et al. |
| 8,170,762 B2 * | 5/2012 | Foster et al. .................... 701/60 |
| 8,187,151 B2 * | 5/2012 | Gloge ............................ 477/159 |
| 8,216,112 B2 | 7/2012 | Gibson et al. |
| 8,297,249 B2 | 10/2012 | Seufert et al. |
| 8,328,681 B2 * | 12/2012 | Kaltenbach et al. ............... 477/5 |
| 8,393,998 B2 * | 3/2013 | Akebono et al. ................. 477/12 |
| 8,651,998 B2 * | 2/2014 | Schenk et al. .................... 477/5 |
| 2002/0107103 A1 | 8/2002 | Nakamori et al. |
| 2004/0157704 A1 | 8/2004 | Stork et al. |
| 2005/0102082 A1 | 5/2005 | Joe et al. |
| 2005/0215393 A1 | 9/2005 | Shimoda |
| 2005/0222735 A1 | 10/2005 | Usuki et al. |
| 2007/0142142 A1 | 6/2007 | Yamaguchi et al. |
| 2007/0204817 A1 | 9/2007 | Russell et al. |
| 2008/0011529 A1 | 1/2008 | Hoher et al. |
| 2008/0017427 A1 | 1/2008 | Nakanowatari |
| 2008/0220937 A1 | 9/2008 | Nozaki et al. |
| 2009/0112423 A1 | 4/2009 | Foster et al. |
| 2009/0143189 A1 | 6/2009 | Hasegawa et al. |
| 2010/0018808 A1 | 1/2010 | Gloge |
| 2010/0056328 A1 | 3/2010 | Schenk et al. |
| 2010/0197451 A1 | 8/2010 | Kaltenbach et al. |
| 2010/0204862 A1 | 8/2010 | Uejima et al. |
| 2011/0082630 A1 | 4/2011 | Kawaguchi et al. |
| 2011/0256978 A1 | 10/2011 | Falkenstein |
| 2011/0276207 A1 | 11/2011 | Falkenstein |
| 2012/0105925 A1 * | 5/2012 | Shirai et al. .................... 358/498 |
| 2012/0108388 A1 * | 5/2012 | Akebono et al. ................. 477/12 |
| 2012/0109438 A1 * | 5/2012 | Akebono et al. ................. 701/22 |
| 2012/0109439 A1 * | 5/2012 | Akebono et al. ................. 701/22 |
| 2012/0203406 A1 * | 8/2012 | Akebono et al. ................. 701/22 |
| 2013/0218391 A1 | 8/2013 | Aizawa et al. |
| 2013/0218392 A1 | 8/2013 | Aizawa et al. |

FOREIGN PATENT DOCUMENTS

| | | |
|---|---|---|
| JP | 2000-170888 A | 6/2000 |
| JP | 2001-018690 A | 1/2001 |
| JP | 2010-077981 A | 4/2010 |
| JP | 2010-179860 A | 8/2010 |
| JP | 2010-195363 A | 9/2010 |

OTHER PUBLICATIONS

S. Mochiyama, U.S. PTO Office Action, U.S. Appl. No. 13/281,990, dated Nov. 30, 2012, 10 pages.
H. Akebono, U.S. PTO Notice of Allowance, U.S. Appl. No. 13/283,938, dated Dec. 28, 2012, 14 pages.
U.S. Appl. No. 13/281,939, filed Oct. 26, 2011, Nagashima et al.
U.S. Appl. No. 13/283,991, filed Oct. 28, 2011, Akebono et al.
U.S. Appl. No. 13/283,938 filed Oct. 28, 2011, Akebono et al.
U.S. Appl. No. 13/283,974 filed Oct. 28, 2011, Akebono et al.
U.S. Appl. No. 13/283,954 filed Oct. 28, 2011, Akebono et al.
U.S. Appl. No. 13/281,990, filed Oct. 26, 2011, Mochiyama et al.
H. Akebono, U.S. PTO Office Action, U.S. Appl. No. 13/283,991, dated Mar. 14, 2013, 10 pages.
U.S. Appl. No. 13/361,640, filed Jan. 30, 2012, Akebono et al.
S. Mochiyama, U.S. PTO Office Action, U.S. Appl. No. 13/281,990, dated Sep. 9, 2013, 12 pages.
F. Nagashima, U.S. PTO Notice of Allowance, U.S. Appl. No. 13/281,939, dated Sep. 23, 2013, 19 pages.
S. Mochiyama, U.S. PTO Office Action, U.S. Appl. No. 13/281,990, dated May 10, 2013, 10 pages.
H. Akebono, U.S. PTO Office Action, U.S. Appl. No. 13/283,954, dated Jul. 9, 2013, 28 pages.
H. Akebono, U.S. PTO Notice of Allowance, U.S. Appl. No. 13/283,991, dated Jul. 9, 2013, 10 pages.
H. Akebono, U.S. PTO Notice of Allowance, U.S. Appl. No. 13/283,954, dated Dec. 23, 2013, 14 pages.
H. Akebono, U.S. PTO Notice of Allowance, U.S. Appl. No. 13/361,640, dated Oct. 30, 2013, 20 pages.

* cited by examiner

HYDRAULIC CONTROL APPARATUS FOR VEHICLE

BACKGROUND OF THE INVENTION

The present invention relates to a hydraulic control apparatus for a vehicle.

As a hydraulic control apparatus, for example, it is disclosed in Japanese Patent Provisional Publication No. 2010-77981 (hereinafter is referred to as "JP2010-77981"). JP2010-77981 discloses a WSC control that starts the vehicle while controlling an output torque of driving force by slip-engaging a second brake after judging an initiation of engagement of a starting frictional element.

SUMMARY OF THE INVENTION

During execution of the WSC control, when a driver depresses a brake pedal and the vehicle is in a vehicle stop state, since the slip-engagement of a clutch (the second brake) is held unchanged, the clutch generates heat, and this leads to deterioration of the clutch. In order to suppress the heat generation of the clutch, an input torque to the clutch can be reduced. Thus, to reduce the input torque, it is conceivable that a transmission torque capacity of the clutch can be reduced. In order to reduce the transmission torque capacity of the clutch, a hydraulic pressure that engages the clutch is decreased. However, at this time, a feedback control is performed so that an actual hydraulic pressure agrees with a command hydraulic pressure.

Here, a control range of the transmission torque capacity of the clutch during the execution of the WSC control also in the vehicle stop state is extremely narrow (or low) as compared with a control range of the transmission torque capacity of the clutch in a normal travelling state. Because of this, in the case where the control is performed so as to decrease the engagement hydraulic pressure of the clutch during the execution of the WSC control, even if the feedback control is carried out, the clutch is prone to be in a fully disengaged state.

When the driver releases the brake pedal and intends to start the vehicle while the clutch is in the fully disengaged state, the clutch state shifts from the fully disengaged state to an engaged state. Thus, there is a possibility that an engagement shock will occur at this clutch state shift.

On the other hand, in the case where the control is performed so that the engagement hydraulic pressure of the clutch is higher in order to prevent the clutch from being in the fully disengaged state, the input torque of the clutch becomes large, then the heat generation of the clutch can not be suppressed.

For these problems, it is therefore an object of the present invention to provide a hydraulic control apparatus for the vehicle, which is capable of improving the accuracy of the clutch control and reducing the occurrence of the clutch engagement shock at the vehicle start while suppressing the heat generation of the clutch in the control range where the transmission torque capacity of the clutch (a frictional engagement element) is low.

According to one aspect of the present invention, a hydraulic control apparatus for controlling an engagement hydraulic pressure provided to a frictional engagement element that is arranged between a driving source and a driving wheel and connects/disconnects a torque transmitted between the driving source and the driving wheel in a vehicle, has: a target engagement hydraulic pressure calculation section that calculates a target engagement hydraulic pressure of the frictional engagement element; a slip control section that controls the frictional engagement element so that a revolution speed at a driving source side of the frictional engagement element is a higher revolution speed than a revolution speed at a driving wheel side of the frictional engagement element; a command current output section that outputs a command current to a solenoid valve that controls the engagement hydraulic pressure provided to the frictional engagement element on the basis of a map that has a relationship between the target engagement hydraulic pressure and the command current; a hydraulic pressure decrease section that when a vehicle speed is equal to or less than a predetermined vehicle speed at which the vehicle is judged to be vehicle stop during execution of the slip control, decreases the engagement hydraulic pressure provided to the frictional engagement element; and a correction section that when the hydraulic pressure decrease section decreases the engagement hydraulic pressure, corrects the map so that a variation of the command current with respect to a variation of the target engagement hydraulic pressure is small.

According to another aspect of the invention, a method for controlling an engagement hydraulic pressure provided to a frictional engagement element that is arranged between a driving source and a driving wheel and connects/disconnects a torque transmitted between the driving source and the driving wheel in a vehicle, has: calculating a target engagement hydraulic pressure of the frictional engagement element; controlling the frictional engagement element so that a revolution speed at a driving source side of the frictional engagement element is a higher revolution speed than a revolution speed at a driving wheel side of the frictional engagement element; outputting a command current to a solenoid valve that controls the engagement hydraulic pressure provided to the frictional engagement element on the basis of a map that has a relationship between the target engagement hydraulic pressure and the command current; decreasing the engagement hydraulic pressure provided to the frictional engagement element when a vehicle speed is equal to or less than a predetermined vehicle speed at which the vehicle is judged to be vehicle stop during execution of the slip control, and correcting the map so that a variation of the command current with respect to a variation of the target engagement hydraulic pressure is small when decreasing the engagement hydraulic pressure.

The other objects and features of this invention will become understood from the following description with reference to the accompanying drawings.

DETAILED DESCRIPTION OF THE INVENTION

According to the present invention, during execution of a slip control that controls a frictional engagement element so that a revolution speed at a driving source side of the frictional engagement element is a higher revolution speed than a revolution speed at a driving wheel side of the frictional engagement element, when a vehicle speed is equal to or less than a predetermined vehicle speed at which the vehicle is judged to be vehicle stop, an engagement hydraulic pressure provided to the frictional engagement element is decreased. Also, when the engagement hydraulic pressure is decreased at this time, a map of a relationship between a target engagement hydraulic pressure and a command current is corrected so that a variation of the command current with respect to a variation of the target engagement hydraulic pressure is small.

It is therefore possible to improve the accuracy of the frictional engagement element control and reduce the occurrence of the clutch engagement shock at the vehicle start while suppressing the heat generation of the clutch in the control range where the transmission torque capacity of the frictional engagement element is low.

Embodiments of the present invention will now be explained below with reference to the drawings.

Embodiment 1

[Drive System]

Figure 1:
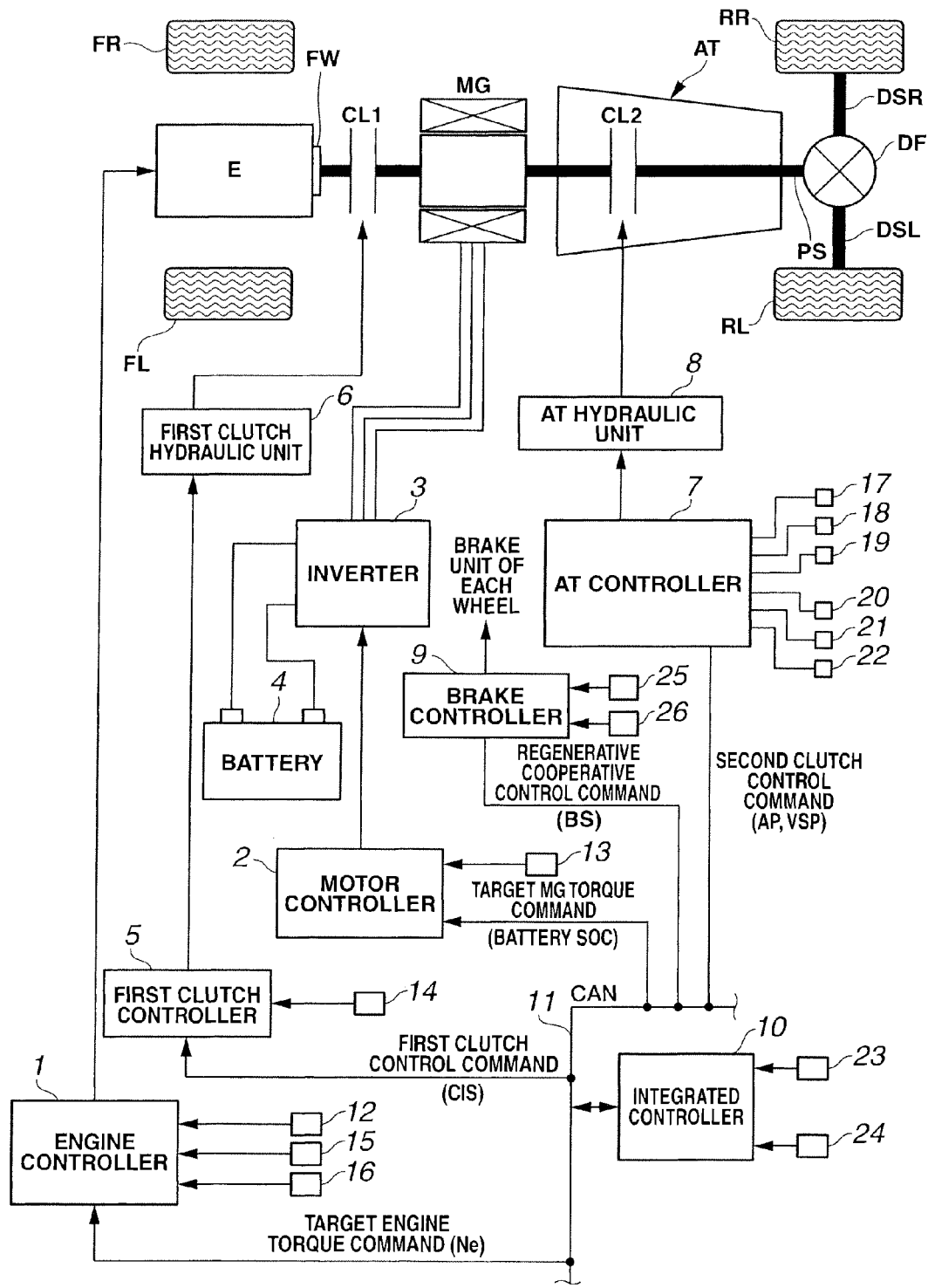
FIG. 1 is a whole system block diagram showing a hybrid vehicle of an embodiment 1.

First, a drive system of a hybrid vehicle will be explained. FIG. 1 is a whole system block diagram showing a rear-drive hybrid vehicle of the embodiment 1.

The drive system of the hybrid vehicle in the embodiment 1 has an engine E, a first clutch CL1, a motor/generator MG, a second clutch CL2, an automatic transmission AT, a propeller shaft PS, a differential gear DF, a left drive shaft DSL, a right drive shaft DSR, a rear left wheel RL (driving wheel), and a rear right wheel RR (driving wheel). Needless to say, FL is a front left wheel, and FR is a front right wheel.

The engine E is, for instance, a gasoline engine, and a valve opening of throttle valve etc. is controlled on the basis of a control command from an after-mentioned engine controller 1. As shown in FIG. 1, a flywheel FW is provided at an engine output shaft.

The first clutch CL1 is a clutch that is arranged between the engine E and the motor/generator MG. Engagement/slip-engagement/disengagement of the first clutch CL1 are controlled by a control pressure that is produced by a first clutch hydraulic unit 6 on the basis of a control command from an after-mentioned first clutch controller 5.

The motor/generator MG is a synchronous type motor/generator in which a permanent magnet is embedded in a rotor and a stator coil is wound around a stator. The motor/generator MG is controlled through the application of a three-phase alternating current that is generated by an inverter 3 on the basis of a control command from an after mentioned motor controller 2. This motor/generator MG works as an electric motor that performs a rotational drive operation by receiving a power from a battery 4 (hereinafter, this state is called a power running state). And also, in a case where the rotor is rotated by an external force, the motor/generator MG works as a generator that generates an electromotive force at both ends of the stator coil, and is able to charge the battery 4 (hereinafter, this operating state is called a regenerative state). Here, the rotor of this motor/generator MG is connected to an input shaft of the automatic transmission AT through a damper (not shown).

The second clutch CL2 is a clutch that is arranged between the motor/generator MG and the rear left and rear right wheels RL, RR. Engagement/slip-engagement/disengagement of the second clutch CL2 are controlled by a control pressure that is produced by an AT hydraulic unit 8 on the basis of a control command from an after-mentioned AT controller 7.

The automatic transmission AT is a transmission that automatically changes a transmission ratio of multispeed (multistage) of, for example, forward 7 speeds and reverse 1 speed according to a vehicle speed and an accelerator opening and so on. Here, the above second clutch CL2 is not a clutch that is newly added as a special clutch. The second clutch CL2 is a frictional engagement element used as one of a plurality of frictional engagement elements which are engaged in each speed or each shift stage in the automatic transmission AT.

An output shaft of the automatic transmission AT is connected to the rear left and rear right wheels RL, RR through the propeller shaft PS as a vehicle drive shaft, the differential gear DF, the left drive shaft DSL and the right drive shaft DSR. Here, with regard to the first and second clutches CL1 and CL2, for example, a wet multiple disc clutch whose hydraulic flow amount and hydraulic pressure can be continuously controlled by a proportional solenoid is used.

This hybrid drive system has three drive modes in accordance with a state of the engagement/disengagement of the first clutch CL1. A first drive mode is an electric vehicle drive mode (hereinafter called an EV drive mode) as a motor-used drive mode in which the first clutch CL1 is in a disengaged state and the vehicle travels by only the power of the motor/generator MG as the power source. A second drive mode is an engine-used drive mode (hereinafter called an HEV drive mode) in which the first clutch CL1 is in an engaged state and the vehicle travels while including the engine E as the power source. A third drive mode is an engine-used slip drive mode (hereinafter called a WSC drive mode) in which the first clutch CL1 is in the engaged state and the second clutch CL2 is slip-controlled then the vehicle travels while including the engine E as the power source. This mode is a mode that is capable of achieving a creep drive especially when a state of charge of a battery (SOC) is low or an engine water temperature is low. Here, when changing the mode from the EV drive mode to the HEV drive mode, the first clutch CL1 is engaged, and the engine start is carried out by using the torque of the motor/generator MG.

When an accelerator hill hold control in which a driver controls an accelerator pedal and maintains a vehicle stop state on an uphill whose road slope or gradient is a predetermined value or greater is carried out, since a revolution speed of the engine E cannot be set to be lower than an idle speed, an undesirable state in which a slip amount of the second clutch CL2 is too large might continue in the case of the WSC drive mode. Accordingly, in the embodiment 1, the hybrid drive system further has a motor slip drive mode (hereinafter called an MWSC drive mode) in which, the first clutch CL1 is disengaged while the engine E is working, and the second clutch CL2 is slip-controlled while the motor/generator MG is working, then the vehicle travels with the motor/generator MG being the power source. Details will be described later.

With regard to the HEV drive mode, it has three drive modes; an engine drive mode, a motor assist drive mode, and a travelling power generation mode.

The engine drive mode is a mode that drives the driving wheels with only the engine E being the power source. The motor assist drive mode is a mode that drives the driving wheels with both of the engine E and the motor/generator MG being the power source. The travelling power generation mode is a mode that drives the driving wheels RL, RR with the engine E being the power source also simultaneously operates the motor/generator MG as the generator.

At a constant speed drive and an acceleration drive, the motor/generator MG works as the generator by using the power of the engine E. At a deceleration drive, by receiving a regenerative brake energy, the motor/generator MG generates the power, and this power is used to charge the battery 4.

Furthermore, as another mode, the hybrid drive system has a power generation mode in which the motor/generator MG works as the generator at the vehicle stop by using the power of the engine E.

[Control System]

Next, a control system of the hybrid vehicle will be explained. As shown in FIG. 1, the control system of the hybrid vehicle has the engine controller 1, the motor controller 2, the inverter 3, the battery 4, the first clutch controller 5, the first clutch hydraulic unit 6, the AT controller 7, the AT hydraulic unit 8, a brake controller 9, and an integrated controller 10. Here, the engine controller 1, the motor controller 2, the first clutch controller 5, the AT controller 7, the brake controller 9 and the integrated controller 10 are connected with each other through a CAN communication line 11 that allows the exchange of information between them.

The engine controller 1 inputs information of an engine revolution speed (an engine rpm) Ne from an engine rpm sensor 12, an accelerator pedal opening APO from an accelerator pedal opening sensor 15, the throttle opening from a throttle opening sensor 16. The engine controller 1 outputs a command that controls an engine operating or working point (Ne: the engine revolution speed, Te: an engine torque) to, for instance, a throttle valve actuator (not shown in the drawing) in accordance with a target engine torque command etc. from the integrated controller 10. Here, information concerning the engine revolution speed Ne etc. is sent to the integrated controller 10 via the CAN communication line 11.

The motor controller 2 inputs information from a resolver 13 that detects a rotation position of the rotor of the motor/generator MG, and outputs a command that controls a motor operating or working point (Nm: a motor/generator revolution speed, Tm: a motor/generator torque) of the motor/generator MG to the inverter 3 in accordance with a target motor/generator torque command etc. from the integrated controller 10. Here, this motor controller 2 checks or watches the battery SOC indicating the charge state of the battery 4. The information of this battery SOC is used as control information of the motor/generator MG, and also is sent to the integrated controller 10 via the CAN communication line 11.

The first clutch controller 5 inputs information of a first clutch hydraulic pressure PCL1 from a first clutch hydraulic pressure sensor 14, and outputs a command that controls the engagement/disengagement of the first clutch CL1 to the first clutch hydraulic unit 6 in accordance with a first clutch control command from the integrated controller 10.

The AT controller 7 inputs information from a side brake (or hand brake or parking brake) switch 17, a brake switch 18, an inhibitor switch 19 that outputs a signal corresponding to a shift lever position operated by the driver, an input rpm sensor 20 that detects an input revolution speed Nin inputted to the automatic transmission AT, an output rpm sensor 21 that detects an output revolution speed Nout outputting from the automatic transmission AT, and a second clutch hydraulic pressure sensor 22 that detects a second clutch hydraulic pressure PCL2. The AT controller 7 determines a shift position according to the input information, and outputs a command that controls the engagement/disengagement of each engagement element to the AT hydraulic unit 8 on the basis of the determined shift position. Here, information of the inhibitor switch, the input revolution speed Nin, the output revolution speed Nout, etc. is sent to the integrated controller 10 via the CAN communication line 11.

The brake controller 9 inputs sensor information from a wheel speed sensor 25 that detects each wheel speed of the four wheels and a brake stroke sensor 26. In addition, for instance, when a braking force by only a regenerative braking force is insufficient for a required braking force determined by a brake stroke BS upon a brake operation by driver's brake pedal depression, the brake controller 9 performs a regenerative brake cooperative control on the basis of a regenerative cooperative control command from the integrated controller 10 so that the shortage of the braking force is compensated by a mechanical braking force (a braking force by a friction brake).

The integrated controller 10 is a controller that controls a consumption energy of the whole vehicle, and performs the operation in order for the hybrid vehicle to travel at a maximum efficiency. The integrated controller 10 inputs an oil temperature in the automatic transmission AT from an AT oil temperature sensor 23 and a back-and-forth acceleration from a back-and-forth acceleration sensor 24, also inputs information obtained via the CAN communication line 11.

Further, the integrated controller 10 performs an operating control of the engine E by the control command to the engine controller 1, an operating control of the motor/generator MG by the control command to the motor controller 2, the engagement/disengagement control of the first clutch CL1 by the control command to the first clutch controller 5, and the engagement/disengagement control of the second clutch CL2 by the control command to the AT controller 7.

[Configuration of Integrated Controller]

Figure 2:
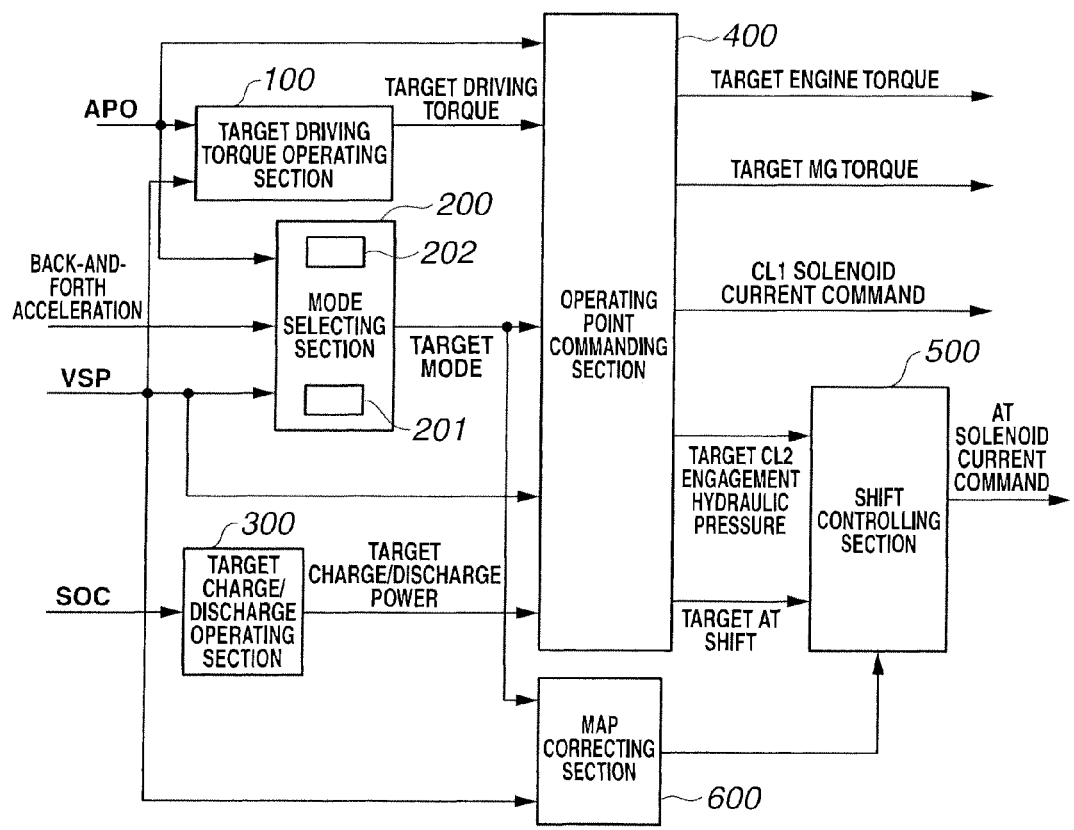
FIG. 2 is a control block diagram of an integrated controller of the embodiment 1.

FIG. 2 is a control block diagram of the integrated controller 10. In the following description, a control executed in the integrated controller 10 of the embodiment 1 will be explained with reference to the control block diagram in FIG. 2. This operation is executed for instance at a control cycle period 10 msec in the integrated controller 10. The integrated controller 10 has a target driving torque operating section 100, a mode selecting section 200, a target charge/discharge operating section 300, an operating point commanding section 400, a speed change or shift change controlling section (simply, a shift controlling section) 500 and a map correcting section 600.

Figure 3:
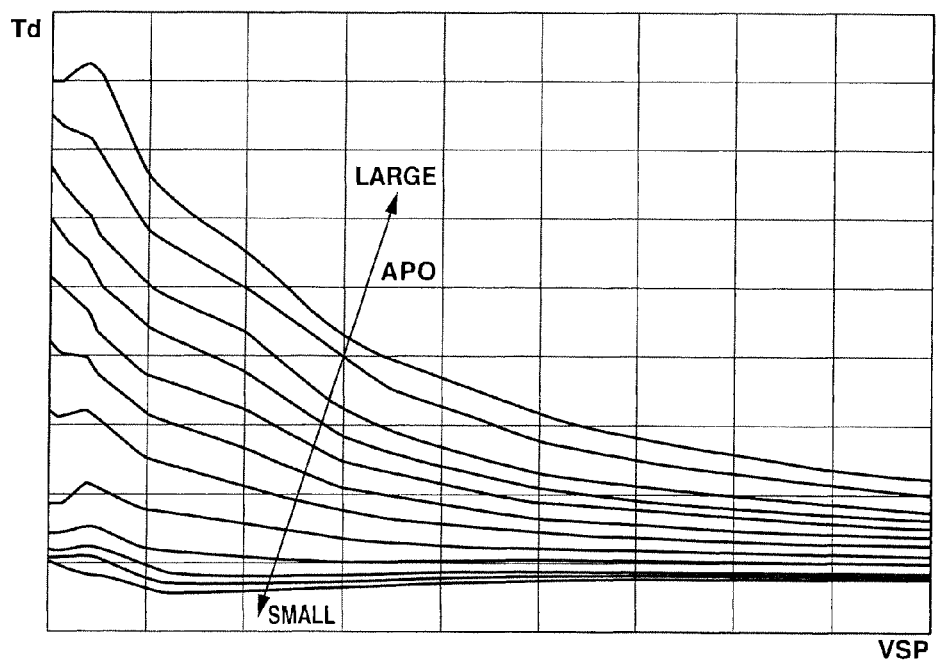
FIG. 3 is a target driving torque map of the embodiment 1.

FIG. 3 is a target driving torque map. The target driving torque operating section 100 calculates a target driving torque Td on the basis of the accelerator pedal opening APO and the vehicle speed VSP using the target driving torque map shown in FIG. 3.

The mode selecting section 200 has a road slope estimation operating section 201 that estimates a slope or a gradient of road on the basis of a detection value of the back-and-forth acceleration sensor 24. The road slope estimation operating section 201 calculates an actual acceleration from an average of acceleration of the wheel speed etc. detected by the wheel speed sensor 25, and estimates the road slope on the basis of a difference between this calculation result and the back-and-forth acceleration sensor detection value.

Figure 4:
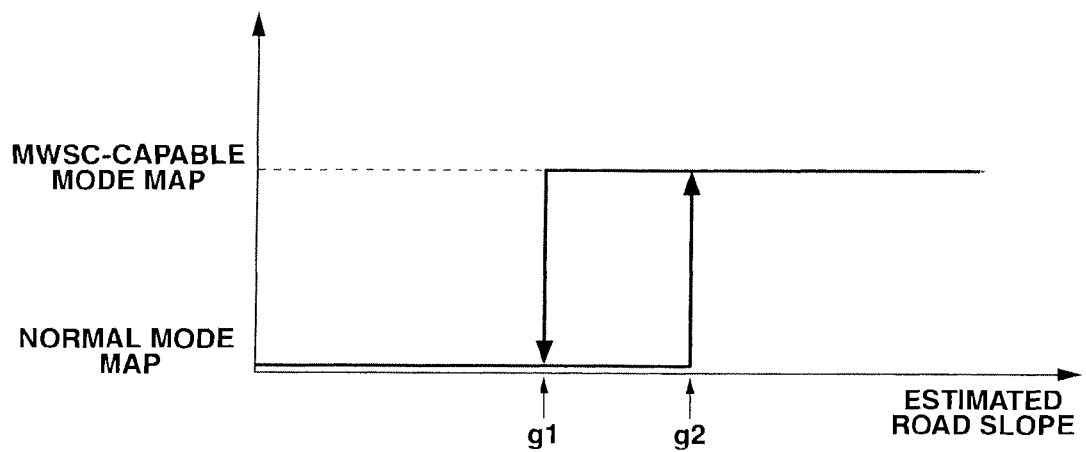
FIG. 4 is a schematic diagram showing selection logic of a mode map selecting section of the embodiment 1.

The mode selecting section 200 further has a mode map selecting section 202 that selects any one of two mode maps (described later) on the basis of the estimated road slope. FIG. 4 is a schematic diagram showing selection logic of the mode map selecting section 202. The mode map selecting section 202 changes the map from a normal mode map to an MWSC-capable mode map when the estimated slope becomes equal to or greater than a certain value g2 in a condition where the normal mode map is selected. On the other hand, the mode map selecting section 202 changes the map from the MWSC-capable mode map to the normal mode map when the estimated slope becomes less than a certain value g1 (<g2) in a condition where the MWSC-capable mode map is selected. That is to say, a hysteresis is set for the estimated slope (for the change between the both mode maps), thereby preventing a hunting upon the map change.

Figure 5:
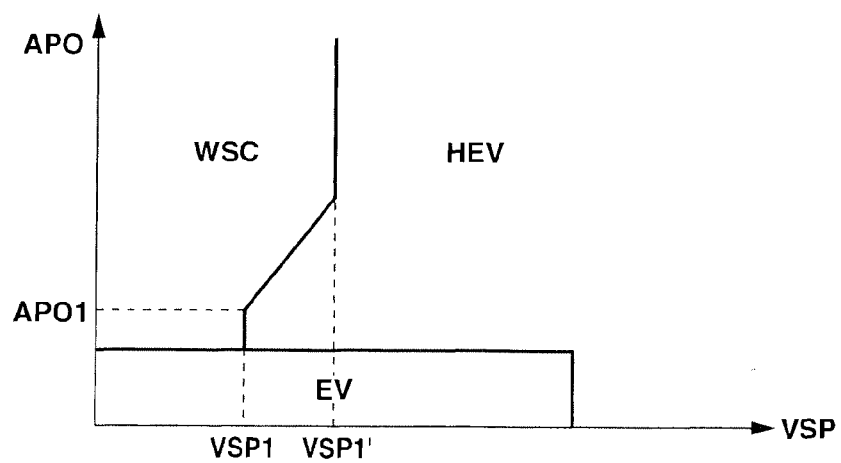
FIG. 5 is a normal mode map of the embodiment 1.
Figure 6:
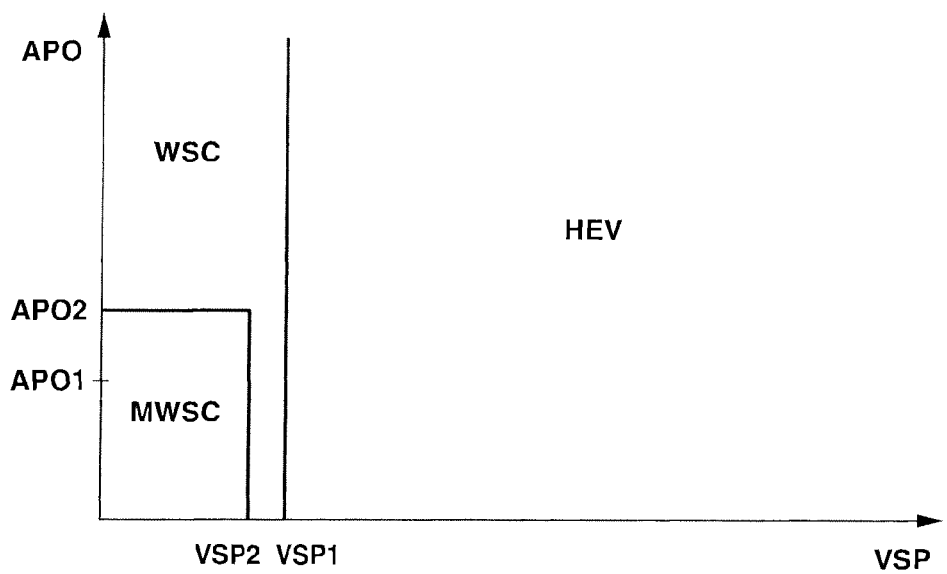
FIG. 6 is an MWSC mode map of the embodiment 1.

Next, the mode map will be explained. As the mode map, the normal mode map that is selected when the estimated slope is less than the certain value, and the MWSC-capable mode map that is selected when the estimated slope is greater than or equal to the certain value, are set. FIG. 5 illustrates the normal mode map. FIG. 6 illustrates the MWSC mode map.

In the normal mode map in FIG. 5, the EV drive mode, the WSC drive mode and the HEV drive mode are set, then on the basis of the accelerator pedal opening APO and the vehicle speed VSP, the target mode is operated. However, even if the EV drive mode is selected, in a case where the battery SOC is smaller than or equal to a predetermined value, the target mode becomes the HEV drive mode compulsorily or forcibly.

In the normal mode map in FIG. 5, with regard to an HEV→WSC change line, in an area where the accelerator pedal opening APO is less than a predetermined accelerator opening APO1, the HEV→WSC change line (the WSC drive mode) is set in an area where the vehicle speed VSP is lower than a lower limit vehicle speed VSP1. Here, the lower limit vehicle speed VSP1 is a vehicle speed at which the engine rpm becomes smaller than the idle speed of the engine E when the automatic transmission AT is 1st speed. In an area where the accelerator pedal opening APO is the predetermined accelerator opening APO1 or greater, since a great driving torque is required, the WSC drive mode is set up to an area of a vehicle speed VSP1' that is higher than the lower limit vehicle speed VSP1. However, this drive mode change control is configured so that when the battery SOC is low and the EV drive mode cannot be achieved, even in a case of the vehicle start, the WSC drive mode is selected.

Here, there is a case where when the accelerator pedal opening APO is large, it is difficult to achieve this request of the large accelerator pedal opening APO by the engine torque corresponding to the engine rpm around the idle speed and the torque of the motor/generator MG. Here, regarding the engine torque, as the engine rpm increases, more torque can be outputted. For this reason, even if the WSC drive mode is carried out up to a higher vehicle speed than the lower limit vehicle speed VSP1, by increasing the engine rpm and outputting the greater torque, the mode can change from the WSC drive mode to the HEV drive mode in a short time. This case corresponds to the WSC area that is extended or increased up to the vehicle speed VSP1' in FIG. 5.

On the other hand, as for the MWSC mode map in FIG. 6, the EV drive mode is not set in the MWSC mode map. This point is different from the normal mode map. Further, regarding the WSC drive mode area, it is not changed according to the accelerator pedal opening APO, and is set or defined by only the lower limit vehicle speed VSP1. This point is also different from the normal mode map. In addition, the MWSC drive mode is set in the WSC drive mode area. This point is also different from the normal mode map. The MWSC drive mode is set in an area defined by a predetermined vehicle speed VSP2 that is lower than the lower limit vehicle speed VSP1 also by a predetermined accelerator opening APO2 that is higher than the predetermined accelerator opening APO1. Details of the MWSC drive mode will be described later.

Figure 7:
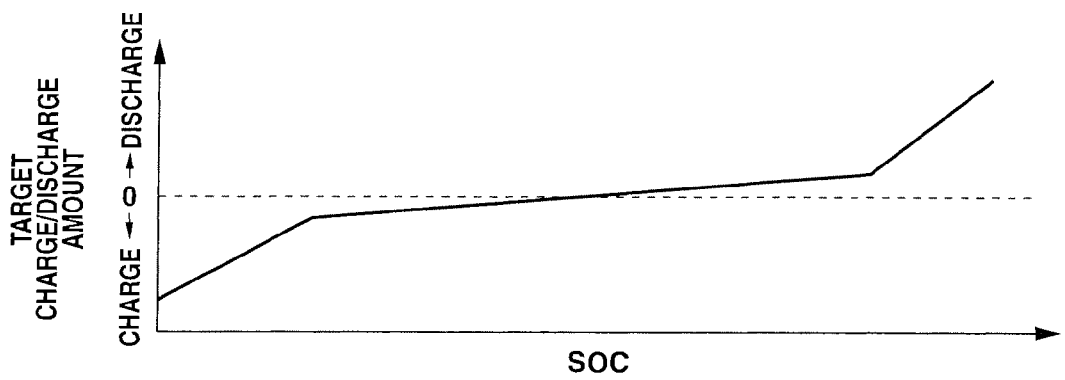
FIG. 7 is a target charge/discharge amount map of the embodiment 1.

FIG. 7 is a target charge/discharge amount map. The target charge/discharge operating section 300 calculates a target charge/discharge power tP on the basis of the battery SOC using the target charge/discharge amount map shown in FIG. 7.

The operating point commanding section 400 calculates transitional target engine torque/target engine revolution speed, target motor/generator torque/target motor/generator revolution speed, target second clutch engagement hydraulic pressure, a target transmission ratio of the automatic transmission AT and a first clutch solenoid current command on the basis of the accelerator pedal opening APO, the target driving torque Td, the target mode, the vehicle speed VSP and the target charge/discharge power tP, as attainment targets of these operating points. Further, the operating point commanding section 400 is provided with an engine start controlling section that starts the engine E when changing the mode from the EV drive mode to the HEV drive mode.

The shift controlling section 500 controls drive of a solenoid valve in the automatic transmission AT to attain the target second clutch engagement hydraulic pressure and the target shift stage (target shift position, the target transmission ratio) along a shift schedule set in a shift map. Here, the shift map is a map in which the target shift stage is preset according to the vehicle speed VSP and the accelerator pedal opening APO. The shift controlling section 500 has a map of a command current of the solenoid valve for setting the target engagement hydraulic pressure provided to each frictional engagement element in the automatic transmission AT.

Figure 8:
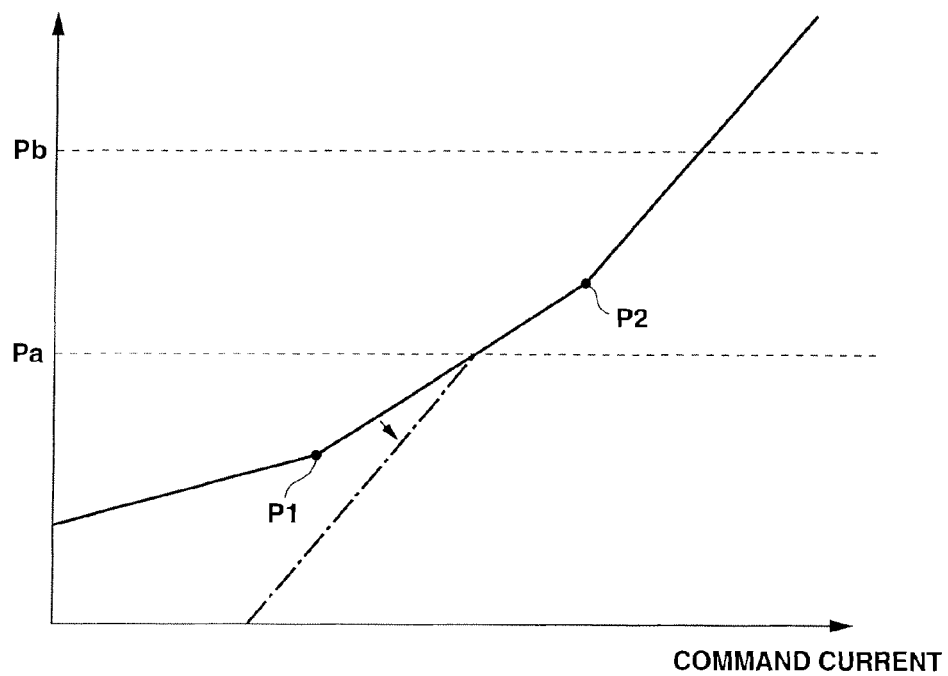
FIG. 8 is a target engagement hydraulic pressure-command current map of a second clutch of the embodiment 1.

FIG. 8 is an example of a target engagement hydraulic pressure-command current map of the second clutch CL2. As can be seen in the drawing, the map is shown by lines connecting a plurality of inflection points P (P1 and P2 in FIG. 8). A plurality of the maps are prepared according to a characteristic of the target engagement hydraulic pressure provided to the frictional engagement element and the command current of the solenoid valve, then one of these maps is selected and used before the hydraulic control apparatus is mounted in the vehicle.

Before mounting the hydraulic control apparatus in the vehicle, the current is applied to the solenoid valve and the hydraulic pressure provided to the frictional engagement element is measured. Further, a relationship between measured current that passes through the solenoid valve and measured hydraulic pressure provided to the frictional engagement element is recorded as an operating point or a working point. Then, a plurality of the records of this operating point are made within a predetermined range (hereinafter called a fitting range) of the hydraulic pressure. The fitting range is, for example, a range from 50 [kPa] to about a line pressure of an oil pump. A feature or characteristic of the relationship between the measured current passing through the solenoid valve and the measured hydraulic pressure provided to the frictional engagement element is determined from the recorded operating points, and a map whose characteristic is closest to this determined characteristic is selected.

The map correcting section 600 inputs the vehicle speed VSP and the target mode, and corrects the target engagement hydraulic pressure-command current map of the second clutch CL2. Regarding the map correction, it will be explained later.

[WSC Drive Dode]

Next, the WSC drive mode will be explained in detail. The WSC drive mode is characterized by the maintaining of an engine working state, and response to a change of the target driving torque is high. More specifically, the first clutch CL1 is fully engaged, and the second clutch CL2 is slip-controlled as the transmission torque capacity according to the target driving torque, then the vehicle travels using the driving torque of the engine E and/or the motor/generator MG.

In the hybrid vehicle in the embodiment 1, an element such as a torque converter that absorbs a difference of rotation is not present. Thus, if the first clutch CL1 and the second clutch CL2 are fully engaged respectively, the vehicle speed is determined in accordance with the engine revolution speed. In order to maintain self-rotation of the engine E, the engine E has the lower limit determined by the idle speed. When a so-called idle-up operation is carried out during engine warm-up, the idle speed, i.e. the lower limit tends to further rise. Furthermore, in the condition where the required driving torque is high, there is a case where a rapid mode change to the HEV drive mode cannot be achieved.

On the other hand, in the EV drive mode, since the first clutch CL1 is disengaged, there is no limit on the lower limit of the above engine revolution speed. However, when the traveling by the EV drive mode is difficult due to a limit by the battery SOC, or when the target driving torque cannot be attained by only the motor/generator MG, there is no other way than to produce a stable torque by the engine E.

Therefore, when the vehicle is in a low vehicle speed area where the vehicle speed is lower than the speed corresponding to the above lower limit also in the area where the traveling by the EV drive mode is difficult or the target driving torque cannot be attained by only the motor/generator MG, the engine revolution speed is maintained at a predetermined lower limit revolution speed, and the second clutch CL2 is slip-controlled, then the WSC drive mode in which the vehicle travels using the engine torque is selected.

Figure 9A:
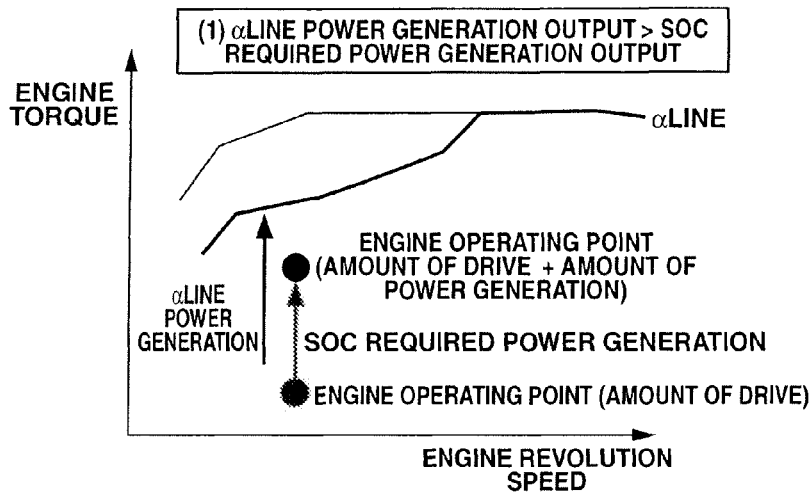
FIGS. 9A~9C are schematic diagrams showing an engine operating point setting process in a WSC drive mode of the embodiment 1.
Figure 9B:
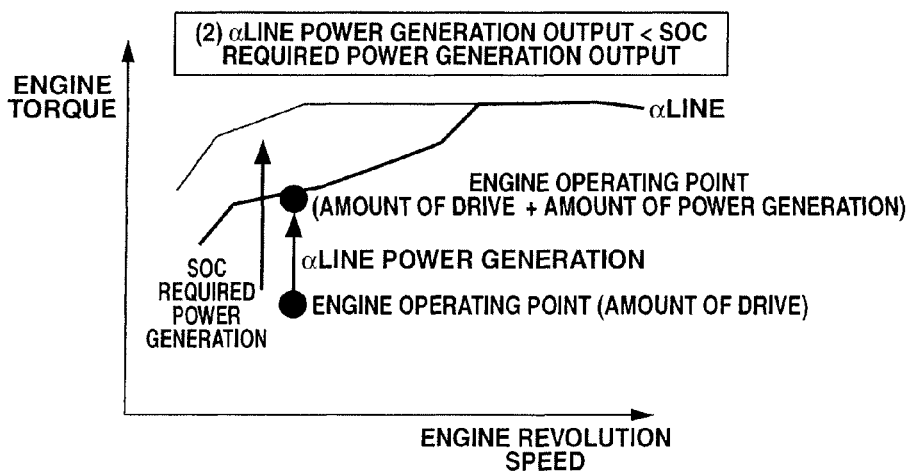
Figure 9C:
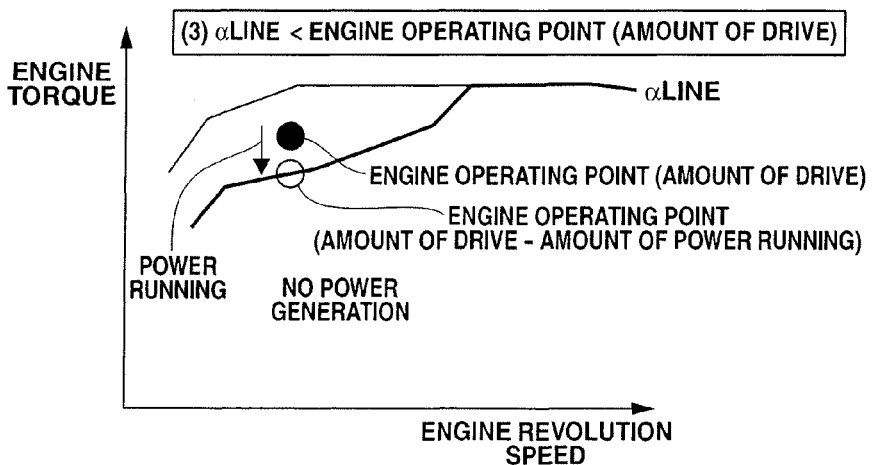
Figure 10:
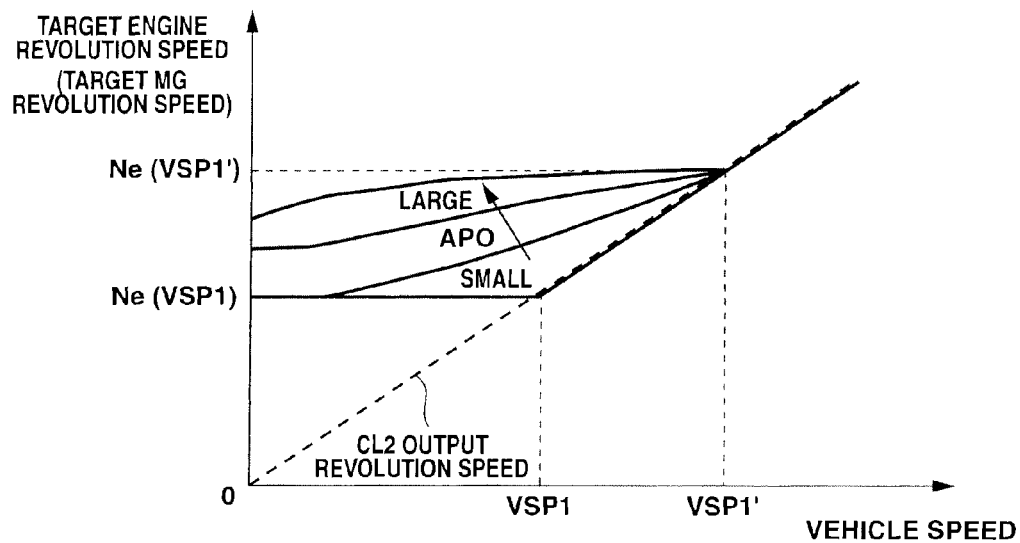
FIG. 10 is a map showing a target engine revolution speed in the WSC drive mode of the embodiment 1.

FIGS. 9A to 9C are schematic diagrams showing an engine operating point setting process in the WSC drive mode. FIG. 10 is a map showing the target engine revolution speed in the WSC drive mode.

In the WSC drive mode, when the driver operates the accelerator pedal, a target engine revolution speed characteristic according to the accelerator pedal opening is selected on the basis of FIG. 10, and the target engine revolution speed according to the vehicle speed is set along this characteristic. And by the engine operating point setting process shown in FIGS. 9A to 9C, the target engine torque corresponding to the target engine revolution speed is calculated.

Here, the operating point of the engine E is defined as a point that is determined by the engine revolution speed and the engine torque. As illustrated in FIGS. 9A to 9C, with respect to the operating point, it is preferable that the operation be executed on a line (hereinafter called an $\alpha$ line) connecting points of high output efficiency.

However, when the engine revolution speed is set as described above, there is a case where the operating point that deviates from the $\alpha$ line is selected depending on the accelerator pedal opening APO (the target driving torque) by the driver. Therefore, in order to bring the engine operating point closer to the $\alpha$ line, the engine torque is feed-forward controlled to a value based on the a line.

On the other hand, as for the motor/generator MG, a revolution speed feedback control whose target revolution speed is the set engine revolution speed is executed. Here, since the engine E and the motor/generator MG are in a directly connected state, by controlling the motor/generator MG to maintain the target revolution speed, the revolution speed of the engine E is also automatically feedback-controlled.

At this time, the torque outputted by the motor/generator MG is automatically controlled so that a difference between the target engine torque set on the basis of the $\alpha$ line and the target driving torque is compensated. The motor/generator MG is provided with a basic or fundamental torque control amount (regeneration/power running) to compensate for this difference, and further is feedback-controlled so as to agree with the target engine revolution speed.

In a case where the target driving torque is smaller than a driving torque on the $\alpha$ line at a certain engine revolution speed, when increasing an engine output torque, an engine output efficiency is increased. At this time, by collecting or recovering the energy that corresponds to the increased engine output torque by the motor/generator MG, the torque itself that is inputted to the second clutch CL2 becomes the driver's required torque, and also the power generation of good efficiency can be achieved.

However, since a torque upper limit by which the motor/generator MG can generate the power is determined by the state of the battery SOC, there is a need to consider a relation of magnitude between a required power generation output (SOC required power generation power) determined by the battery SOC and a difference ($\alpha$ line power generation power) between a torque at a current operating point and a torque on the $\alpha$ line.

FIG. 9A is the schematic diagram of a case where the $\alpha$ line power generation power is greater than the SOC required power generation power. Since the engine output torque cannot be increased to the SOC required power generation power or greater, the operating point cannot be moved on the $\alpha$ line. However, by moving the operating point to a higher efficiency point, a fuel efficiency is improved.

FIG. 9B is the schematic diagram of a case where the $\alpha$ line power generation power is smaller than the SOC required power generation power. If the $\alpha$ line power generation power is within a range of the SOC required power generation power, since the engine operating point can be moved on the $\alpha$ line, in this case, it is possible to generate the power while maintaining the operating point of a highest fuel efficiency.

FIG. 9C is the schematic diagram of $\alpha$ case where the engine operating point is higher than the $\alpha$ line. When the operating point according to the target driving torque is higher than the $\alpha$ line, with the proviso that there is a margin for the battery SOC, the engine torque is lowered, and the shortage is compensated by the power running of the motor/generator MG. With this operation, it is possible to attain the target driving torque while improving the fuel efficiency.

Figure 11:
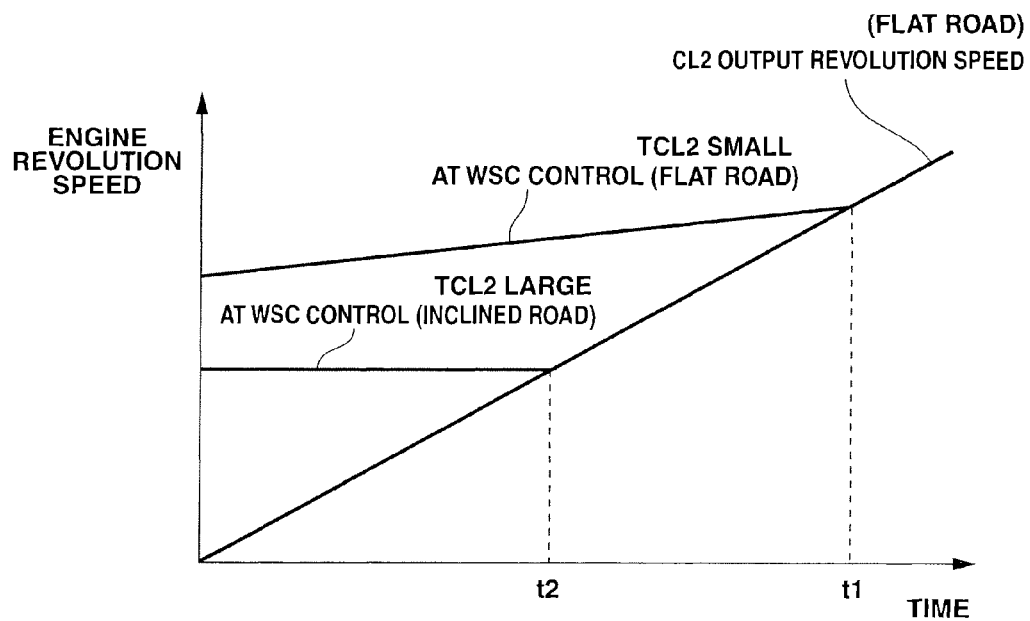
FIG. 11 is an engine revolution speed map of the embodiment 1.

Next, a change of the WSC drive mode area according to the estimated slope will be explained. FIG. 11 is an engine revolution speed map when increasing the vehicle speed in a predetermined condition.

When the accelerator pedal opening APO is greater than the accelerator opening APO1 on a flat road, the WSC drive mode area is carried out up to a vehicle speed area that is higher than the lower limit vehicle speed VSP1. At this time, as shown in the map of FIG. 10, the target engine revolution speed is gradually increased with increase in the vehicle speed. Then when the vehicle speed reaches a speed corresponding to the vehicle speed VSP1', the slip state of the second clutch CL2 disappears, and the mode is changed to the HEV drive mode.

On an inclined road whose estimated slope is greater than the certain slopes (g1 or g2), when attempting to maintain the same vehicle speed increase state as the above operation, the accelerator pedal opening APO becomes large. At this time, a second clutch transmission torque capacity TCL2 becomes large as compared with the flat road. If the WSC drive mode area is extended in this condition as shown in the map of FIG. 5, the second clutch CL2 is maintained in the slip state with a strong engagement force, then there is a risk that a heat value of the second clutch CL2 will be too large. Thus, in the MWSC-capable mode map in FIG. 6 which is selected in the case of the inclined road whose estimated slope is great, the WSC drive mode area is not extended unnecessarily, but is set up to the area corresponding to the lower limit vehicle speed VSP1. With this setting, excessive heat generation in the WSC drive mode is avoided.

[MWSC Drive Mode]

Next, the reason why the MWSC drive mode area is set will be explained. In the case where the estimated slope is greater than the certain slopes (g1 or g2), for instance, when attempting to maintain the vehicle in the stop state or in a slight vehicle speed traveling state without using the brake pedal operation, a large driving torque is required as compared with the flat road. This is because that there is a need to maintain the vehicle against the weight load of the vehicle.

From the viewpoint of the avoidance of the heat generation caused by the slip of the second clutch CL2, when there is the margin for the battery SOC, it could be possible to select the EV drive mode. In this case, when the mode area changes from the EV drive mode area to the WSC drive mode area, the engine start is needed. Thus, since the motor/generator MG outputs the driving torque while securing the torque for the engine start, a driving torque upper limit is narrowed or lessened unnecessarily.

Furthermore, when only the torque is outputted to the motor/generator MG and the rotation of the motor/generator MG is stopped or is set to an extremely low revolution speed in the EV drive mode, a lock current flows to a switching element of the inverter (a phenomenon in which the current continues flowing to one switching element occurs), and there is a possibility that durability will be lowered.

Further, at the area (the area of the vehicle speed VSP2 or less) that is lower than the lower limit vehicle speed VSP1 corresponding to the idle speed of the engine E when the automatic transmission AT is 1st speed, the revolution speed of the engine E itself cannot be reduced to be lower than the idle speed. At this time, if the WSC drive mode is selected, there is a risk that the slip amount of the second clutch CL2 is large and this affects the durability of the second clutch CL2.

Especially on the inclined road, since the large driving torque is required as compared with the flat road, the transmission torque capacity required of the second clutch CL2 becomes high, and the state of the high slip amount and the high torque is maintained. This tends to cause the deterioration of the durability of the second clutch CL2. In addition, since the increase of the vehicle speed is slow, this takes a time to change the mode to the HEV drive mode, and there is a possibility that the heat will be further generated.

Thus, the MWSC drive mode, in which the first clutch CL1 is disengaged with the engine E working, and the revolution speed of the motor/generator MG is feedback-controlled to a target revolution speed that is higher than an output speed of the second clutch CL2 by a predetermined speed while controlling the transmission torque capacity of the second clutch CL2 to the driver's target driving torque, is set.

That is to say, the second clutch CL2 is slip-controlled with the rotation state of the motor/generator MG set to a revolution speed that is lower than the idle speed of the engine. At the same time, the control of the engine E is changed to the feedback control with the idle speed being the target revolution speed. In the WSC drive mode, the engine revolution speed is maintained by the revolution speed feedback control of the motor/generator MG. On the other hand, when the first clutch CL1 is disengaged, the engine revolution speed cannot be controlled to the idle speed by the motor/generator MG. Therefore, an engine revolution speed feedback control is executed by the engine E itself.

By the setting of the MWSC drive mode area, the following effects can be obtained.

1) Since the engine E is in the working state, there is no need for the motor/generator MG to secure the driving torque required for the engine start, and the driving torque upper limit of the motor/generator MG can be large. More specifically, when thinking of a target driving torque axis, the MWSC drive mode can meet the high target driving torque as compared with the EV drive mode area.
2) Since the rotation state of the motor/generator MG is secured, the durability of the switching element etc. can be improved.
3) Since the motor/generator MG rotates at the revolution speed that is lower than the idle sped, it is possible to reduce the slip amount of the second clutch CL2, then the durability of the second clutch CL2 can be improved.

[Target Engagement Hydraulic Pressure-Command Current Map]

With regard to the target engagement hydraulic pressure-command current map, as shown in FIG. 8, the smaller the target engagement hydraulic pressure, the greater the variation of the command current with respect to a variation of the target engagement hydraulic pressure. That is, a slope of a graph becomes small. The map shown in FIG. 8 is a map of a normally-low type in which the more the current passing through the solenoid valve, the greater the engagement hydraulic pressure provided to the frictional engagement element. Also in a case of a map of a normally-high type in which the more the current passing through the solenoid valve, the smaller the engagement hydraulic pressure provided to the frictional engagement element, the smaller the target engagement hydraulic pressure, the greater the variation of the command current with respect to the variation of the target engagement hydraulic pressure. Here, since the target engagement hydraulic pressure-command current map used is selected on the basis of the operating point of the fitting range, accuracy outside the fitting range is lower than the accuracy within the fitting range.

[Map Correction Process]

Figure 12:
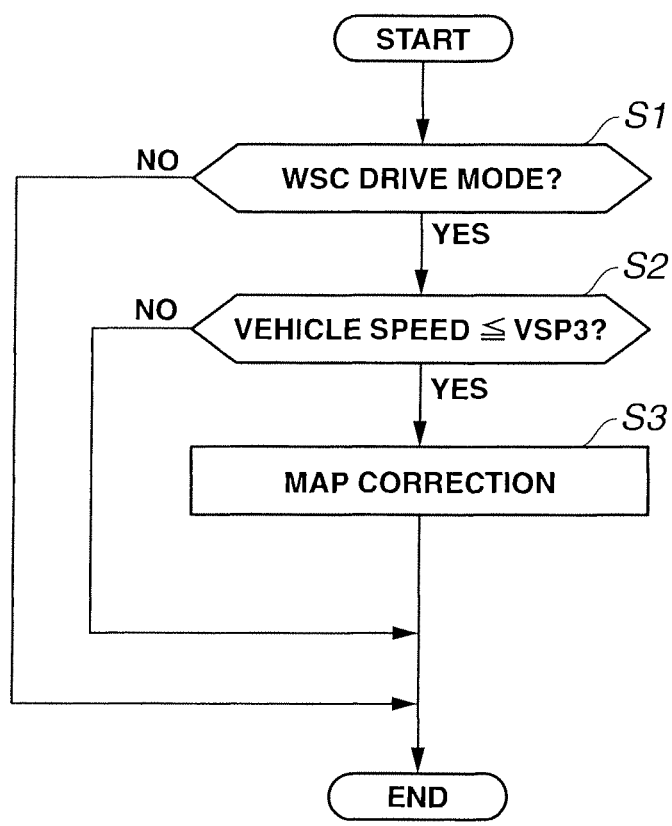
FIG. 12 is a flow chart showing a flow of a map correction process of the embodiment 1.

FIG. 12 is a flow chart showing a flow of a map correction process executed in the map correcting section 600.

At step S1, a judgment is made as to whether or not a current drive mode is the WSC drive mode (a slip control state in which the revolution speed at a driving source side of the second clutch CL2 is controlled to the higher revolution speed than the revolution speed at a driving wheel side of the second clutch CL2). If YES (the current drive mode is the WSC drive mode), the routine proceeds to step S2. If NO (the current drive mode is not the WSC drive mode), this map correction flow is terminated.

At step S2, a judgment is made as to whether or not the vehicle speed is equal to or less than a vehicle speed VSP3. If YES (the vehicle speed is equal to or less than the vehicle speed VSP3), the routine proceeds to step S3. If NO (the vehicle speed is greater than the vehicle speed VSP3), this map correction flow is terminated. The vehicle speed VSP3 is a vehicle speed at which the vehicle can be judged to be the vehicle stop. For instance, the vehicle speed VSP3 is set to 2 [km/h].

At step S3, the map correction of the target engagement hydraulic pressure-command current map of the second clutch CL2 is made, then the map correction flow is terminated.

Here, the map correction will be explained. In FIG. 8, the above-mentioned fitting range indicates a range of an engagement hydraulic pressure Pa or higher. Further, an engagement hydraulic pressure Pb is set in FIG. 8. The engagement hydraulic pressure Pb is a hydraulic pressure which is higher than the inflection point P1 that is the smallest hydraulic pressure among the inflection points also is higher than the engagement hydraulic pressure Pa. The map correction is made by changing a solid line in the drawing to a dashed line in a range that is lower than the engagement hydraulic pressure Pa. That is, a relationship between the variation of the target engagement hydraulic pressure and the variation of the command current in the range that is lower than the engagement hydraulic pressure Pa is equalized to a relationship between the variation of the target engagement hydraulic pressure and the variation of the command current at the engagement hydraulic pressure Pb. In other words, the map correction is made by increasing the slope of the graph (by setting the slope of the graph to be steeper) in the range that is lower than the engagement hydraulic pressure Pa. With this correction, a change of the command current with respect to a change of the target engagement hydraulic pressure can be small.

[Map Correction Process Operation]

When the drive mode is the WSC drive mode and also the vehicle speed is less than or equal to the vehicle speed VSP3, the map correction flow is step S1→step S2→step S3.

Since the map of the second clutch CL2 is corrected at step S3, in the range that is less than the engagement hydraulic pressure Pa, the change of the command current of the solenoid valve with respect to the change of the target engagement hydraulic pressure of the second clutch CL2 can be small as compared with that before the correction.

[Operation]

In the WSC drive mode, when the driver depresses the brake pedal and the vehicle is in the stop state, since the slip-engagement of the second clutch CL2 is held unchanged (since the second clutch CL2 is maintained in the slip state as it is), the second clutch CL2 generates heat, and this leads to deterioration of the second clutch CL2. In order to suppress the heat generation of the second clutch CL2, the input torque to the second clutch CL2 can be reduced. Thus, to reduce the input torque, it is conceivable that the transmission torque capacity of the second clutch CL2 can be reduced. In order to reduce the transmission torque capacity of the second clutch CL2, the engagement hydraulic pressure of the second clutch CL2 is decreased.

On the other hand, if the engagement hydraulic pressure of the second clutch CL2 is decreased to excess, the second clutch CL2 is brought to the fully disengaged state (a state in which the second clutch CL2 is further disengaged from a state in which the transmission torque capacity of the second clutch CL2 is substantially zero). When the second clutch CL2 is fully disengaged, since it takes a time to engage the second clutch CL2 upon the vehicle start, starting response is decreased, also the engagement shock might occur.

Thus, during the vehicle stop in the WSC drive mode, it is desirable that the transmission torque capacity of the second clutch CL2 be substantially zero and also the second clutch CL2 be engaged by an extremely weak force. The engagement hydraulic pressure of the second clutch CL2 at this time is called a standby pressure. The standby pressure is changed depending on a temperature of working fluid, deterioration with time of the second clutch CL2, etc. Therefore, when determining the standby pressure, the engagement hydraulic pressure of the second clutch CL2 is decreased, and an output torque of the motor/generator MG whose revolution speed is controlled at this time is feedback-controlled, then an engagement hydraulic pressure when no change in the output torque of the motor/generator MG occurs is set as the standby pressure.

When setting the standby pressure while decreasing the engagement hydraulic pressure of the second clutch CL2, the second clutch CL2 is prone to be in the fully disengaged state. This is due to the following reasons.

a) The standby pressure is set to an extremely low hydraulic pressure as compared with the engagement hydraulic pressure in the normal travelling state. Since the standby pressure and the engagement hydraulic pressure of the fully disengagement of the second clutch CL2 are close to each other, the engagement hydraulic pressure is prone to overshoot to the fully disengagement side of the second clutch CL2 when setting the standby pressure.

b) In the range where the target engagement hydraulic pressure is low in the map, as compared with the range where the target engagement hydraulic pressure is high, the variation of the command current with respect to the variation of the target engagement hydraulic pressure is great.

When setting the standby pressure, using the map of FIG. 8, the target engagement hydraulic pressure of the second clutch CL2 is decreased, and the command current according to this decrease of the target engagement hydraulic pressure is outputted to the solenoid valve. As compared with a control range of the transmission torque capacity of the second clutch CL2 in the normal travelling state, a control range of the transmission torque capacity of the second clutch CL2 during the execution of the WSC control also in the vehicle stop state is extremely narrow (or low). That is, the standby pressure is also set to an extremely low value. For this reason, it is difficult to execute a small engagement hydraulic pressure control in a setting range of the standby pressure, then the engagement hydraulic pressure is prone to overshoot to the fully disengagement side of the second clutch CL2.

c) In the range that is lower than the engagement hydraulic pressure Pa, the accuracy of the map is low. The standby pressure is set to be lower than the engagement hydraulic pressure Pa. Thus the map accuracy is low in a range where the standby pressure is set. As a consequence, the engagement hydraulic pressure is prone to overshoot to the fully disengagement side of the second clutch CL2 when setting the standby pressure.

d) Overall map accuracy decreases due to the deterioration with time of the second clutch CL2. When the second clutch CL2 deteriorates, an increase in the engagement hydraulic pressure of the second clutch CL2 becomes small with respect to an increase in the current outputted to the solenoid valve. That is, when the second clutch CL2 deteriorates, in fact, the slop of the characteristic becomes gentle (or shallow) as compared with the graph on the map. Therefore, the engagement hydraulic pressure is prone to overshoot to the fully disengagement side of the second clutch CL2 when setting the standby pressure.

Accordingly, in the embodiment 1, the map correcting section 600 is provided. Then, in the case where the mode is the WSC drive mode in which the second clutch CL2 is slip-engaged and also the vehicle speed becomes equal to or less than the vehicle speed VSP3 at which the vehicle is judged to be the vehicle stop, when decreasing the hydraulic pressure provided to the second clutch CL2, the map correcting section 600 corrects the map so that the variation of the command current with respect to the variation of the target engagement hydraulic pressure is small.

With this correction, the change of the command current of the solenoid valve with respect to the change of the target engagement hydraulic pressure of the second clutch CL2 can be small as compared with that before the correction. Consequently, it is possible to perform the transmission torque capacity control of the second clutch CL2 more precisely, and the overshoot to the fully disengagement side of the second clutch CL2 can be suppressed.

Further, in the embodiment 1, the map correction is made in the range that is lower than the engagement hydraulic pressure Pa that is the minimum in the fitting range.

Therefore, in the range that is the engagement hydraulic pressure Pa or greater and where the accuracy of the target engagement hydraulic pressure-command current map is high, by using the original map, the accurate transmission torque capacity control of the second clutch CL2 can be performed. On the other hand, in the range that is less than the engagement hydraulic pressure Pa and where the map accuracy is relatively low, by correcting the map, the accurate transmission torque capacity control of the second clutch CL2 can be achieved.

In addition, in the embodiment 1, the map correction is made using the variation of the command current with respect to the variation of the target engagement hydraulic pressure at the engagement hydraulic pressure Pb.

With regard to the target engagement hydraulic pressure-command current map, the smaller the target engagement hydraulic pressure, the greater the variation of the command current with respect to the variation of the target engagement hydraulic pressure. By setting the engagement hydraulic pressure Pb to the hydraulic pressure that is higher than the inflection point P1 also is higher than the engagement hydraulic pressure Pa, in the range that is the engagement hydraulic pressure Pa or less in the map after the correction, the change of the command current of the solenoid valve with respect to the change of the target engagement hydraulic pressure of the second clutch CL2 can be small as compared with that before the correction. As a consequence, it is possible to perform the transmission torque capacity control of the second clutch CL2 more precisely, and the overshoot to the fully disengagement side of the second clutch CL2 can be suppressed.

[Effect]

Next, effects of the embodiment 1 will be explained. The hydraulic control apparatus of the embodiment 1 has the following effects.

(1) The hydraulic control apparatus for controlling the engagement hydraulic pressure provided to the second clutch CL2 (the frictional engagement element) that is arranged between the driving source (the engine E and the motor/generator MG) and driving wheels RL, RR and connects/disconnects the torque transmitted between the driving source (E; MG) and the driving wheels RL, RR in the vehicle, has: the operating point commanding section 400 (a target engagement hydraulic pressure calculation section) that calculates the target engagement hydraulic pressure of the second clutch CL2; the operating point commanding section 400 (a slip control section) that controls the second clutch CL2 so that the revolution speed at the driving source side of the second clutch CL2 is the higher revolution speed than the revolution speed at the driving wheel side of the second clutch CL2; the shift controlling section 500 (a command current output section) that outputs the command current to the solenoid valve that controls the engagement hydraulic pressure provided to the second clutch CL2 on the basis of the map that has the relationship between the target engagement hydraulic pressure and the command current; the operating point commanding section 400 (a hydraulic pressure decrease section) that when the vehicle speed is equal to or less than the predetermined vehicle speed VSP3 at which the vehicle is judged to be vehicle stop during execution of the slip control, decreases the engagement hydraulic pressure provided to the second clutch CL2; and the map correcting section 600 (a correction section) that when the operating point commanding section 400 decreases the engagement hydraulic pressure, corrects the map so that the variation of the command current with respect to the variation of the target engagement hydraulic pressure is small.

Therefore, the change of the command current of the solenoid valve with respect to the change of the target engagement hydraulic pressure of the second clutch CL2 can be small as compared with that before the correction. As a consequence, it is possible to perform the transmission torque capacity control of the second clutch CL2 more precisely, and the overshoot to the fully disengagement side of the second clutch CL2 can be suppressed.

(2) In the hydraulic control apparatus, before the hydraulic control apparatus is mounted in the vehicle, the solenoid valve is operated and the relationship between the engagement hydraulic pressure and the command current is recorded as the operating point within the fitting range (a predetermined range) of the hydraulic pressure, and a plurality of the maps are prepared by a plurality of measurements and records, the map is the map that is selected as the map whose characteristic is closest to the characteristic of a plurality of operating points among a plurality of the maps, the hydraulic pressure that is the minimum value in the fitting range at the measurement is set as the engagement hydraulic pressure Pa (a first threshold value), and the map correcting section 600 makes the correction of the map in the range that is lower than the engagement hydraulic pressure Pa.

Therefore, in the range that is the engagement hydraulic pressure Pa or greater and where the accuracy of the target engagement hydraulic pressure-command current map is high, by using the original map, the accurate transmission torque capacity control of the second clutch CL2 can be performed. On the other hand, in the range that is less than the engagement hydraulic pressure Pa and where the map accuracy is relatively low, by correcting the map, the accurate transmission torque capacity control of the second clutch CL2 can be achieved.

(3) In the hydraulic control apparatus, the map is formed by lines connecting a plurality of inflection points P1, P2, the hydraulic pressure, which is higher than the inflection point P1 that is the smallest hydraulic pressure among the inflection points also is higher than the engagement hydraulic pressure Pa, is set as the engagement hydraulic pressure Pb (a second threshold value), and the map correcting section 600 makes the correction of the map using the variation of the command current with respect to the variation of the target engagement hydraulic pressure at the engagement hydraulic pressure Pb.

Therefore, by setting the engagement hydraulic pressure Pb to the hydraulic pressure that is higher than the inflection point P1 also is higher than the engagement hydraulic pressure Pa, in the range that is the engagement hydraulic pressure Pa or less in the map after the correction, the change of the command current of the solenoid valve with respect to the change of the target engagement hydraulic pressure of the second clutch CL2 can be small as compared with that before the correction. As a consequence, it is possible to perform the transmission torque capacity control of the second clutch CL2 more precisely, and the overshoot to the fully disengagement side of the second clutch CL2 can be suppressed.

Other Embodiments

The embodiment of the present invention has been explained above on the basis of the embodiment 1. However, the configuration or system of the present invention is not limited to the embodiment 1.

In the embodiment 1, the case of FR-type hybrid vehicle has been explained. However, the present invention can also be applied to FF-type hybrid vehicle.

The entire contents of Japanese Patent Application No. 2010-245724 filed on Nov. 1, 2010 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A hydraulic control apparatus for controlling an engagement hydraulic pressure provided to a frictional engagement element that is arranged between a driving source and a driving wheel and that connects/disconnects a torque transmitted between the driving source and the driving wheel in a vehicle, the hydraulic control apparatus comprising:
a target engagement hydraulic pressure calculation section configured to calculate a target engagement hydraulic pressure of the frictional engagement element;
a slip control section configured to control the frictional engagement element such that a revolution speed at a driving source side of the frictional engagement element is a higher revolution speed than a revolution speed at a driving wheel side of the frictional engagement element;
a command current output section configured to output a command current to a solenoid valve that controls the engagement hydraulic pressure provided to the frictional engagement element based on a map that has a relationship between the target engagement hydraulic pressure and the command current;
a hydraulic pressure decrease section that, when a vehicle speed is equal to or less than a predetermined vehicle speed at which the vehicle is judged to be at a vehicle stop during execution of slip control, is configured to decrease the engagement hydraulic pressure provided to the frictional engagement element; and
a correction section that, when the hydraulic pressure decrease section decreases the engagement hydraulic pressure, is configured to correct the map such that a variation of the command current with respect to a variation of the target engagement hydraulic pressure is smaller than a prior-to-correction variation of the command current with respect to a prior-to correction variation of the target engagement hydraulic pressure.

2. The hydraulic control apparatus as claimed in claim 1, wherein:
before the hydraulic control apparatus is mounted in the vehicle, the solenoid valve is operated and a relationship between the engagement hydraulic pressure and the command current is recorded as an operating point within a predetermined range of the hydraulic pressure, and a plurality of maps are prepared by a plurality of measurements and records,
the map is selected from the plurality of maps as having a characteristic closest to a characteristic of a plurality of operating points among the plurality of the maps,
a hydraulic pressure that is a minimum value in the predetermined range at a measurement is set as a first threshold value, and
the correction section makes the correction of the map in a range that is lower than the first threshold value.

3. The hydraulic control apparatus as claimed in claim 2, wherein:
the map is formed by lines connecting a plurality of inflection points,
a hydraulic pressure, which is higher than an inflection point that is a smallest hydraulic pressure among the inflection points that also is higher than the first threshold value, is set as a second threshold value, and
the correction section makes the correction of the map using the variation of the command current with respect to the variation of the target engagement hydraulic pressure at the second threshold value.

4. A method for controlling an engagement hydraulic pressure provided to a frictional engagement element that is arranged between a driving source and a driving wheel and that connects/disconnects a torque transmitted between the driving source and the driving wheel in a vehicle, the method comprising:
calculating a target engagement hydraulic pressure of the frictional engagement element;
controlling the frictional engagement element so that a revolution speed at a driving source side of the frictional engagement element is a higher revolution speed than a revolution speed at a driving wheel side of the frictional engagement element;
outputting a command current to a solenoid valve that controls the engagement hydraulic pressure provided to the frictional engagement element based on a map that has a relationship between the target engagement hydraulic pressure and the command current;
decreasing the engagement hydraulic pressure provided to the frictional engagement element when a vehicle speed is equal to or less than a predetermined vehicle speed at which the vehicle is judged to be at a vehicle stop during execution of slip control, and
correcting the map such that a variation of the command current with respect to a variation of the target engagement hydraulic pressure when decreasing the engagement hydraulic pressure is smaller than a prior-to-correction variation of the command current with respect to a prior-to correction variation of the target engagement hydraulic pressure.

* * * * *